United States Patent [19]

Akutagawa et al.

[11] Patent Number: 4,739,874
[45] Date of Patent: Apr. 26, 1988

[54] LOADING/UNLOADING APPARATUS FOR LOADING/UNLOADING A WORK ON/FROM A MOVING HANGER

[75] Inventors: Shisho Akutagawa, Kanagawa; Seizo Sunaga, Hiratsuka; Takeshi Saito, Yokohama; Kouji Izumida, Ayase, all of Japan

[73] Assignee: Topy Kogyo Kabushiki Kaisha, Tokyo, Japan

[21] Appl. No.: 60,023

[22] Filed: Jun. 9, 1987

[51] Int. Cl.[4] .............................. B65G 37/; B65G 00
[52] U.S. Cl. .............................. 198/468.2; 198/468.6; 198/680
[58] Field of Search ............... 198/468.2, 468.6, 680, 198/486.1; 414/331, 908, 910

[56] References Cited

U.S. PATENT DOCUMENTS

| | | | |
|---|---|---|---|
| 2,885,063 | 5/1959 | Austin et al. | 198/464.3 |
| 2,918,164 | 12/1959 | Austin et al. | 198/468.6 X |
| 2,960,206 | 11/1960 | Dougherty | 198/464.3 |
| 3,202,261 | 8/1965 | Pianowski | 198/468.6 X |
| 3,888,361 | 6/1975 | Becker et al. | 198/468.6 X |
| 4,699,264 | 10/1987 | Tsuruoka et al. | 198/468.6 X |

FOREIGN PATENT DOCUMENTS

| | | | |
|---|---|---|---|
| 0025082 | 2/1979 | Japan | 198/680 |
| 0688395 | 9/1979 | U.S.S.R. | 198/486.1 |
| 1079560 | 3/1984 | U.S.S.R. | 198/468.6 |
| 1118592 | 10/1984 | U.S.S.R. | 198/468.6 |

Primary Examiner—Robert J. Spar
Assistant Examiner—Cheryl L. Gastineau
Attorney, Agent, or Firm—Cushman, Darby & Cushman

[57] ABSTRACT

A loading/unloading apparatus for loading/unloading a work on/from a moving hanger having a vertically extending support rod and an arm for carrying a work fixed at one end to the support rod. The apparatus comprises a truck, a rail extending in parallel with the arm, a framework slidably mounted on the rail, an upper work-holding device supported by the framework via a lifter, a lower work-holding means supported by the framework via clamp driving device, and a hanger clamping device means. Since the truck is driven at the same speed as the hanger, loading/unloading without stopping the conveyer is possible. Also, since the upper and lower work-holding device are moved in a direction parallel to the direction in which the arm extends, no interference between the work and the arm occurs during loading/unloading. Finally, since the apparatus includes a hanger clamping device means, inclination of the hanger during loading/unloading is prevented.

18 Claims, 5 Drawing Sheets

LOADING/UNLOADING APPARATUS FOR LOADING/UNLOADING A WORK ON/FROM A MOVING HANGER

BACKGROUND OF THE INVENTION

1. Field of the Invention

The present invention relates to a loading/unloading apparatus for loading/unloading a work on/from an arm of a moving hanger.

2. Description of the Prior Art

A painting booth for electro-static painting is disposed at a final stage of a production line for a disk wheel of a vehicle. The path of a hanger conveyer for carrying and conveying a work (in this case, a disk wheel) is disposed so as to pass through the painting booth. Loading/unloading apparatuses are disposed on front and rear sides of the painting booth for loading/unloading the work on/from a hanger of the hanger conveyer. The hanger includes an arm in the form of a rod for carrying the work. The conventional arm extends in a direction at a right angle with respect to a moving direction of the hanger and extends horizontally so that no interference between the work and the arm occurs during loading/unloading of the work.

When the arm of the hanger extends horizontally, however, the paint used in electro-static painting collects on the arm and deteriorates electro-conductivity of the arm so as to cause a deficiency in the painting of the work. For preventing such collection of the paint on the arm, it has been newly considered effective to design the arm to extend obliquely upward in the direction away from a support rod to which the arm is fixed at its one end because the collecting paint flows down along the arm due to gravity. However, when the arm extends obliquely upward, it becomes impossible to load/unload the work on-from the arm in the horizontal direction because interference between the work and the arm occurs.

Since the vertically extending support rod of the conventional hanger is free, balancing of the loaded works during loading/unloading is required for preventing the hanger from inclining and for preventing the works from slipping down from the hanger. Thus, in view of these deficiencies in the prior art apparatus, it has been necessary to develop a loading/unloading apparatus that can load/unload a work on/from an obliquely upward extending arm of a moving hanger yet which does not incline the hanger during loading/unloading. In addition, such loading/unloading has to be performed without stopping movement of the hanger conveyer.

OBJECTS AND SUMMARY OF THE INVENTION

An object of the present invention is to provide a loading/unloading apparatus which is capable of loading/unloading a work on/from an obliquely upward extending arm of a moving hanger without the deficiencies of the prior art.

Another object of the present invention is to provide a loading/unloading apparatus having a hanger which does not incline during loading/unloading of a work.

Still another object of the present invention is to provide a loading/unloading apparatus which is capable of loading/unloading a work without stopping movement of a hanger conveyer.

The above objects can be achieved, according to the present invention, by a loading/unloading apparatus for loading/unloading a work on/from a moving hanger which is driven in a work conveying direction and which comprises a vertically extending support rod and an arm for carrying a work, the arm being fixed at its one end to the support rod, the loading/unloading apparatus comprising:

a truck including a driving mechanism which is capable of driving the truck in the work conveying direction at the same speed as the speed of the hanger;

a rail fixed to the truck which is disposed in a plane which is at a right angle with respect to the work conveying direction and which extends in a direction parallel to the direction in which the arm extends;

a framework supported by the rail such that it slides along the rail in a direction which is at a right angle with respect to the work conveying direction, the framework including a vertically extending slide shaft;

driving means, mounted on the truck, for driving the framework relative to the truck;

a lifter connected to the framework;

upper work-holding means for clamping the work at an upper portion of the work, the upper work-holding means being supported by the lifter and being guided by the slide shaft such that the upper work-holding means slides along the slide shaft in a vertical direction and such that a vertical position of the upper work-holding means is adjusted by the lifter;

lower work-holding means for clamping the work at a lower portion of the work, the lower work-holding means being guided by the slide shaft such that the lower work-holding means slides along the slide shaft in the vertical direction;

clamp driving means, interposed between the framework and the lower work-holding means, for moving the lower work-holding means relative to the upper work-holding means in the vertical direction; and hanger clamping means, mounted on the truck, for clamping an engaging member fixed to a lower portion of the support rod of the hanger, the clamping means being operated so as to clamp the engaging member when the work is being loaded/unloaded.

In the loading/unloading apparatus thus constructed, a work can be clamped/unclamped by the upper work-holding means and the lower work-holding means. Since the upper work-holding means and the lower work-holding means are supported by the framework which is capable of sliding in the direction parallel to the direction in which the arm extends, the work clamped between the upper and lower work-holding means can be moved in the direction parallel to the direction in which the arm extends. As a result, the work can be loaded/unloaded without causing any interference between the work and the arm, even if the arm extends obliquely upward in the direction away from the support rod.

When the work is being loaded/unloaded on/from the arm, the engaging member fixed to the lower portion of the support rod of the hanger is clamped by the hanger clamping means which moves at the same speed as the work. As a result, inclination of the hanger is prevented, and the slipping of the work down from the arm is prevented.

Further, since the upper and lower work-holding means are moved by the truck at the same speed as the work and the hanger, loading/unloading of the work can be performed without stopping the hanger conveyer. As a result, manufacturing efficiency will be increased.

BRIEF DESCRIPTION OF THE DRAWINGS

These and other objects and advantages of the present invention will become apparent and more readily appreciated from the following detailed description of the presently preferred exemplary embodiment of the invention taken in conjunction with the accompanying drawings, of which.

DETAILED DESCRIPTION OF THE PREFERRED EMBODIMENT

Figure 4:
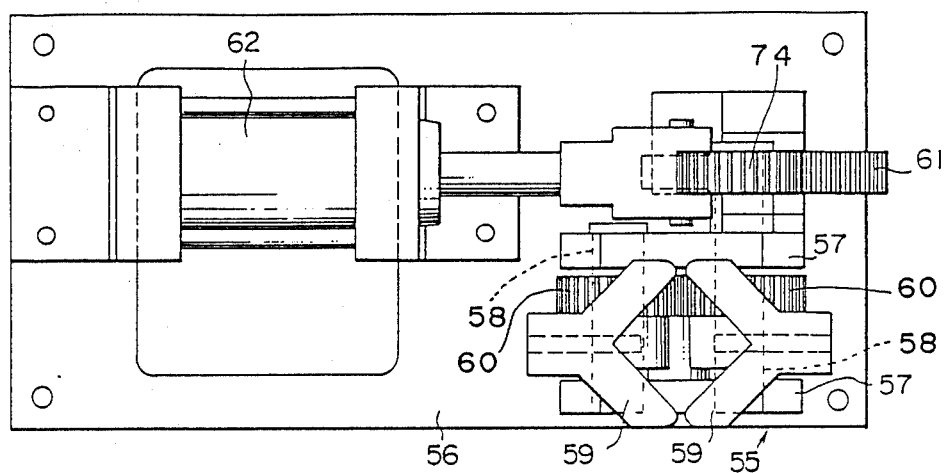
FIG. 4 is a plan view of the hanger clamping means of the apparatus of FIG. 1.
Figure 5:
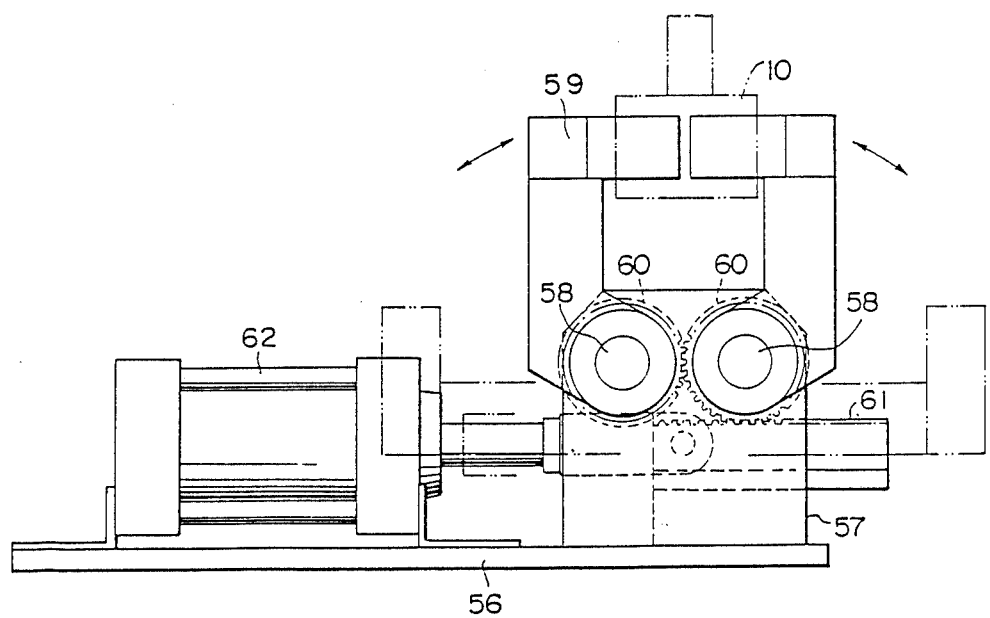
FIG. 5 is an elevational view of the hanger clamping means of FIG. 4.
Figure 6:
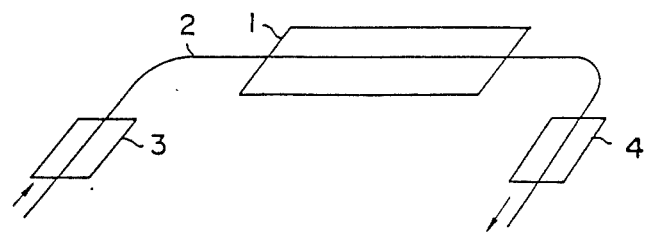
FIG. 6 is a schematic representation of the loading/unloading apparatus of the present invention with respect to a painting apparatus.

FIGS. 1-5 illustrate a loading/unloading apparatus according to one embodiment of the present invention in which, by way of example, a disk wheel for a vehicle is used as a work. FIG. 6 illustrates the disposition of such a loading/unloading apparatus when it is used together with a painting booth for painting a disk wheel of a vehicle.

Figure 1:
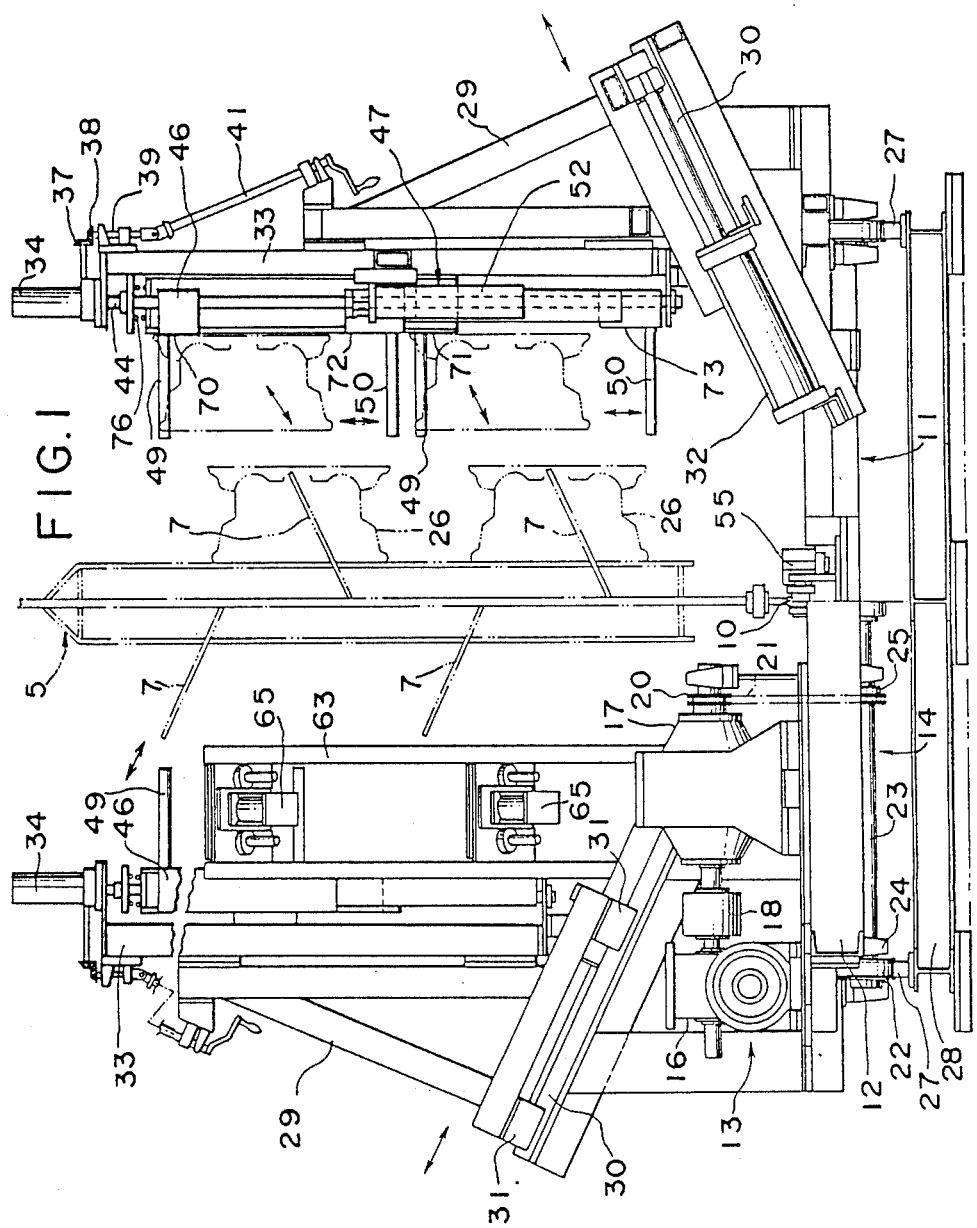
FIG. 1 is an elevational view of a loading/unloading apparatus according to one embodiment of the present invention.

In FIG. 6, reference numeral 1 designates a painting booth for electro-static painting, and reference numeral 2 designates a hanger conveyer for conveying a work such as a disk wheel for a vehicle as shown in FIG. 1. Hanger conveyer 2 passes through painting booth 1, and on a front side and a rear side of the painting booth 1 along a work conveying direction are disposed loading/unloading apparatuses 3 and 4 for loading and unloading the work on and from hanger conveyer 2, respectively. Loading/unloading apparatus 3 disposed on the front side of painting booth 1 is used for loading the work on hanger conveyer 2, and loading/unloading apparatus 4 disposed on the rear side of painting booth 1 is used for unloading the work from hanger conveyer 2. Since loading/unloading apparatuses 3 and 4 have substantially the same structure as each other, detailed explanations will be given only for loading/unloading apparatus 4 hereinafter.

Figure 7:
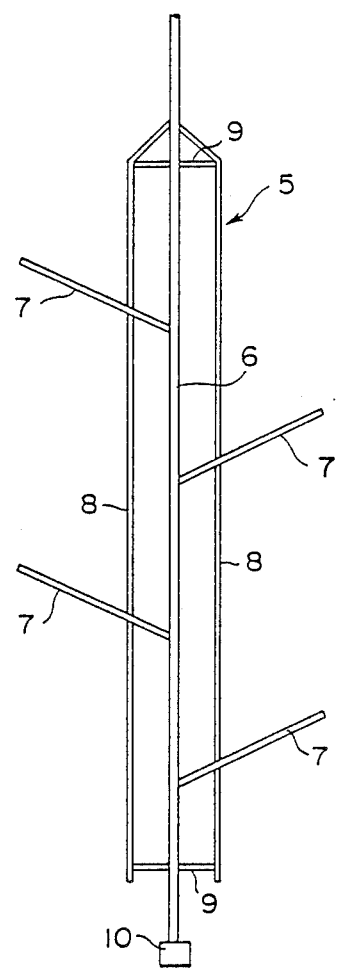
FIG. 7 is an elevational view of a hanger of a hanger conveyer of the apparatus of FIG. 1.

FIG. 7 illustrates a hanger 5 of hanger conveyer 2 for carrying and conveying a work such as a disk wheel 26 shown in FIG. 1. Hanger 5 comprises a material having electro-conductivity, and a plurality of such hangers 5 are provided in hanger conveyer 2. Each hanger 5 comprises a support rod 6 which extends in a vertical direction and is hanged at the upper portion thereof from hanger conveyer 2. Hanger 5 further comprises arms 7 which are fixed at one end thereof to support rod 6 and which extend obliquely upward in a direction away from support rod 6. Each arm 7 extends in a plane which is at a right angle with respect to the work conveying direction, and a plurality of arms 7 are provided on right and left sides of support rod 6 as shown in FIG. 7. Arms 7 on the right side and arms 7 on the left side are staggered with respect to each other in the vertical direction. On right and left sides of support rod 6 are also provided connecting rods 8 which extend in the vertical direction so as to connect arms 7 to each other in the vertical direction. Uppermost and lowermost portions of connecting rods 8 are connected via transverse rods 9 to support rod 6 as shown in FIG. 7, and an engaging member 10 having a square cross-section is connected to the lowermost portion of support rod 6 of hanger 5. Engaging member 10 has square-section so that it may be firmly clamped by a pair of hanger clamping means as will be illustrated hereinafter.

FIGS. 1-5 illustrate the detail of loading/unloading apparatus 4. Reference numeral 11 illustrates a truck which comprises a body 12, a driving mechanism 13 mounted on body 12 for generating a driving force, and a body-carrying portion 14. Truck 11 is driven by driving mechanism 13 so as to move at the same speed as hanger 5. Truck 11 also moves along a rail 27 in the same direction as hanger 5.

Driving mechanism 13 comprises a variable-speed motor 15, a speed reducer 16, and a clutch 17 which are coupled to each other by couplings 18 and 19. A sprocket 20 is connected to an output shaft of clutch 17 and engages with roller chain 21 so as to transmit the driving force which is wound around sprocket 20.

Body-carrying portion 14 comprises wheels 22 and a wheel shaft 23, and wheels 22 are connected to end portions of wheel shaft 23. Wheel shaft 23 is supported via a bearing 24 by body 12. A sprocket 25 is connected to wheel shaft 23, and roller chain 21 is wound around sprocket 25 so that the driving force from driving mechanism 13 is transmitted to wheels 22.

Control of the moving speed of truck 11 is performed by controlling the speed of variable motor 15 such that truck 11 is driven at the same speed as the conveying speed of the work 26 (the speed of hanger 5) which is carried by arm 7 of the moving hanger 5. Rail 27 is a fixed rail on which wheels 22 of truck 11 rotate as they are guided by rail 27. Reference numeral 28 designates a fixed framework for rail 27.

A rail 30 for guiding and sliding a framework 29 is fixed to truck 11 in a plane which is at a right angle with respect to the work conveying direction and moves together with truck 11 in the work conveying direction. Two rails 30 are provided on truck 11, and one of the two rails 30 is disposed on the right side of the path of hanger 5 while the other of the two rails 30 is disposed on the left side of the path of hanger 5 as shown in FIG. 1. One of the two rails 30 is disposed lower than the other of the two rails 30 by the vertical distance between staggered right and left arms 7. Rail 30 obliquely extends in the direction parallel to the direction in which arm 7 of hanger 5 extends. In other words, the inclination of rail 30 is the same as that of arm 7.

Framework 29 is slidable with respect to rail 30 by means of a sliding bearing 31 which is fixed to a lower portion of framework 29. Driving means for driving framework 29 may comprise, for example, an air cylinder 32 which is fixed to truck 11 or rail 30 at its cylinder portion. An end portion of a rod of air cylinder 32 is also connected to the framework 29; therefore, framework 29 is capable of moving toward and receding away from hanger 5 through operation of air cylinder 32 with respect to truck 11. Framework 29 includes a slide shaft holder 33 which extends in the vertical direction and a vertically extending slide shaft 51 which is supported by slide shaft holder 33 at upper and lower end portions of slide shaft 51. Slide shaft holder 33 and slide shaft 51 thus compose one portion of framework 29.

Figure 3:
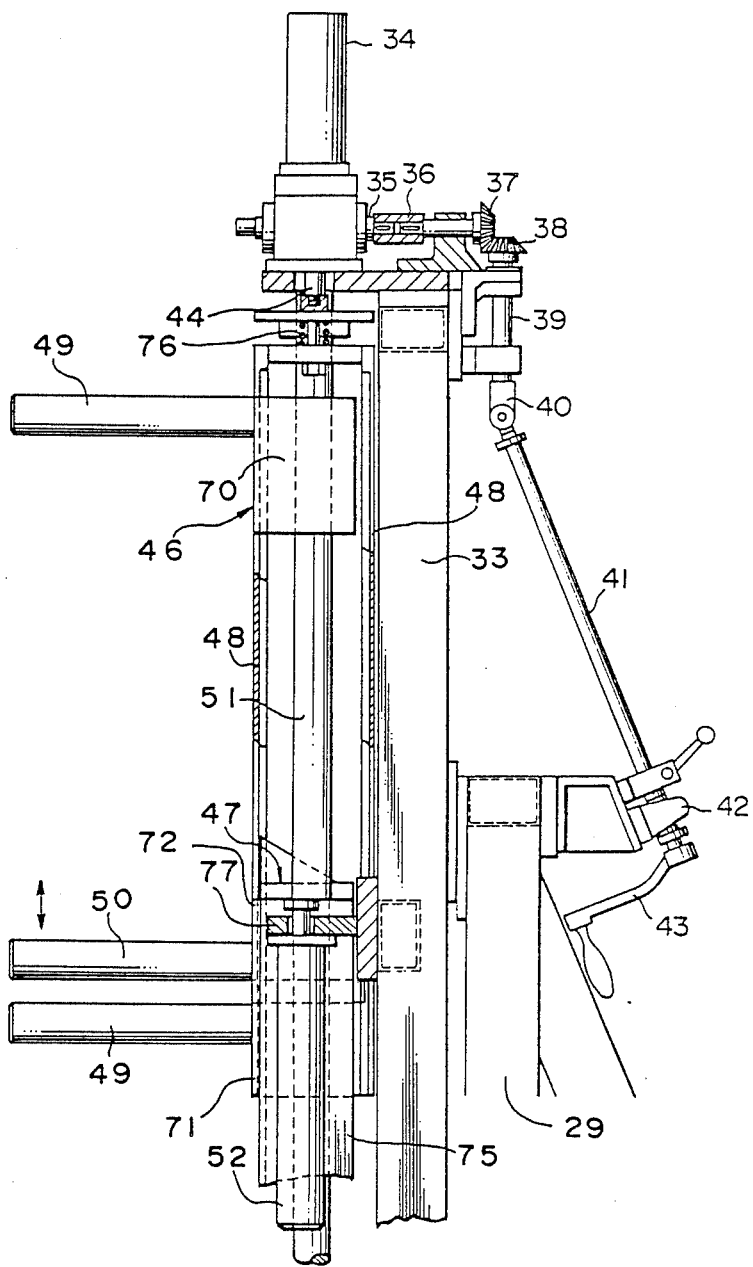
FIG. 3 is an enlarged view of a lifter and the vicinity thereof of the apparatus of FIG. 1.

As shown in FIG. 3, a lifter comprises, for example, a screw jack 34 which is fixed to a top portion of framework 29. An input shaft 35 of screw jack 34 is connected via a coupling 36 to a bevel gear 37 which is engaged with another bevel gear 38. A shaft 39 which is connected to bevel gear 38 is connected via a universal joint 40 to another shaft 41. Shaft 41 is supported via a bearing 42 by slide holder 33, and a handle 43 is coupled to the end portion of shaft 41.

An upper work-holding means 46 which is slidable along slide shaft 51 in the vertical direction is hanged by an output shaft 44 of screw jack 34 such that a position of upper work-holding means 46 can be adjusted in the vertical direction by rotating handle 43.

As shown in FIG. 3, upper work-holding means 46 comprises upper and lower pin holders 70 and 71, a tie bar 48 for connecting pin holders 70 and 71, and upper clamp arm pins 49 which are fixed to each of pin holders 70 and 71. Upper work-holding means 46 is connected via a spring mechanism 76 which composes an upper portion of upper work-holding means 46 to a lower portion of output shaft 44 of screw jack 34. Spring mechanism 76 allows upper and lower pin holders 70 and 71 to move upward relative to output shaft 44 of screw jack 34 in the vertical direction when upper work-holding means 46 receives a large upward force from work 26. There are two connecting tie bars 48 which extend in the vertical direction. There are two pairs of upper clamp arm pins 49, and one pair of upper clamp arm pins 49 is connected to upper pin holder 70 while the other pair of upper clamp arm pins 49 is connected to lower pin holder 71. Each upper clamp arm pin 49 extends horizontally in a plane which is at a right angle with respect to the work conveying direction.

Lower work-holding means 47 is slidable with respect to slide shaft 51 so that lower work-holding means 47 can be moved along slide shaft 51 in the vertical direction. Clamp driving means such as an air cylinder 52 is interposed between a member composing one portion of framework 29 and lower work-holding means 47. A cylinder portion of air cylinder 52 is fixed to the member 77 and a rod portion of air cylinder 52 is connected to lower work-holding means 47. Thus, extension/compression stroke of air cylinder 52 drives lower work-holding means 47 with respect to framework 29 and upper work-holding means 46 in the vertical direction.

Lower work-holding means 47 comprises upper and lower pin holders 72 and 73, a vertically extending tie bar 75 which connects upper and lower pin holders 72 and 73 together, and lower clamp arm pins 50 which are fixed to each of pin holders 72 and 73. There are two pairs of lower clamp arm pins 50 which are fixed to upper and lower pin holders 72 and 73, respectively. Thus, when air cylinder 52 is operated, lower work-holding means 47 moves in a vertical direction relative to upper work-holding means 46, and when lower work-holding means 47 is moved upward, work 26 is clamped and held between upper clamp arm pins 49 and lower clamp arm pins 50.

Figure 2:
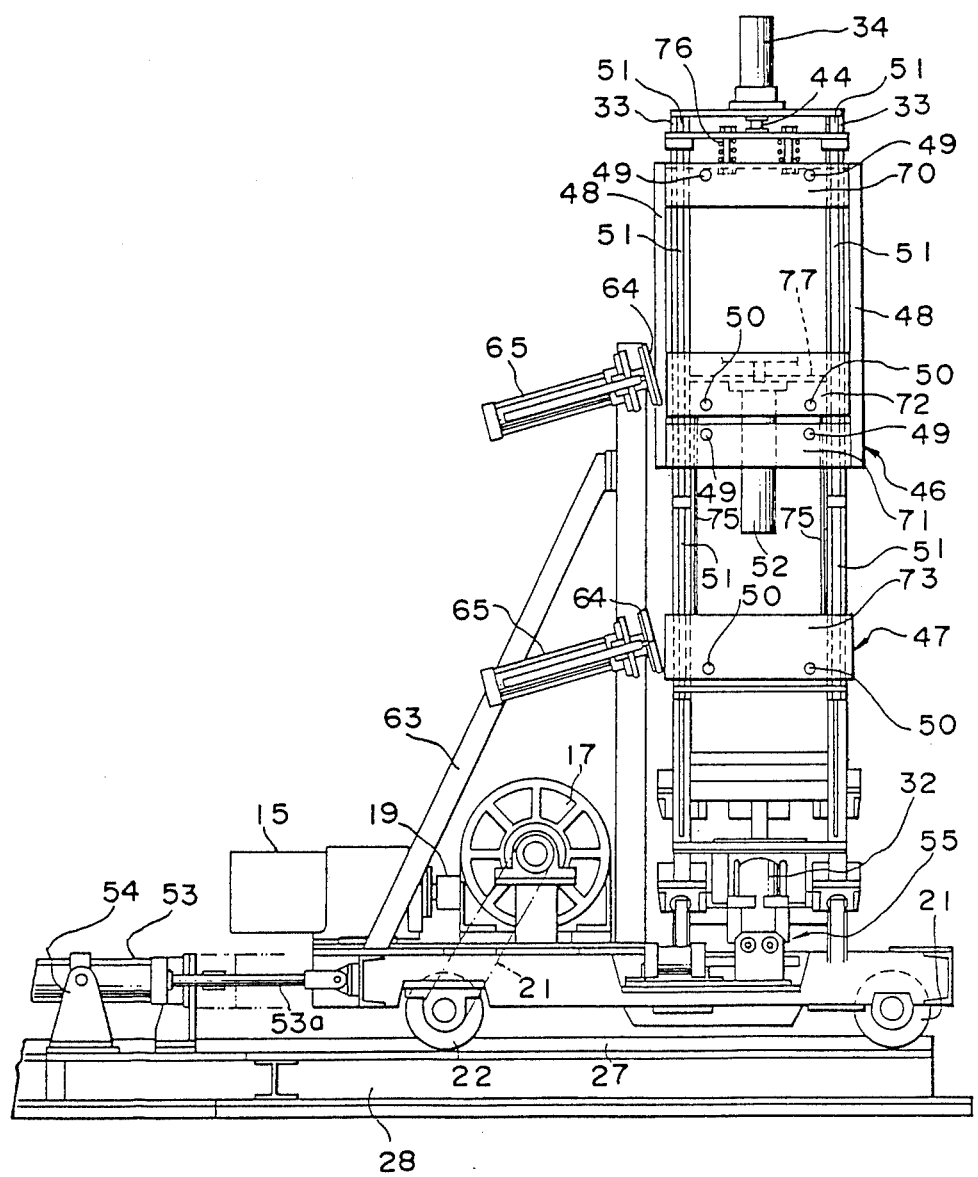
FIG. 2 is a side view of the apparatus of FIG. 1.

As also shown in FIG. 2, at the vicinity of one end of rail 27 on which truck 11 runs, a quick reversing means such as an air cylinder 53 is provided. A cylinder portion of air cylinder 53 is fixed via a bracket 54 to the fixed framework 28, and a rod 53a of air cylinder 53 is connected to truck 11. Air cylinder 53 is operated so as to reverse truck 11 to its original waiting position at a speed faster than the speed at which truck 11 is driven by driving mechanism 13 in the work conveying direction after truck 11 has been driven by variable-speed motor 15 to its stroke end. During such reversing of truck 11, clutch 17 of driving mechanism 13 is cut-off.

A hanger clamping means 55 for clamping engaging member 10 which is fixed to the lower portion of support rod 6 of hanger 5 during the loading/unloading of work 26 is also provided on truck 11. FIGS. 4 and 5 illustrate the structure of hanger clamping means 55. As shown in FIGS. 4 and 5, a pair of support brackets 57 is fixed to a plate 56 which is fixed to truck 11. Two shafts 58 penetrate support brackets 57, and each of a pair of Y-shaped clampers 59 for clamping engaging member 10 are respectively connected to each shaft 58. As shown, clampers 59 are disposed opposite to each other. Also, gears 60 are connected to respective shafts 58 and are mesh-engaged to each other. Another gear 74 is connected to one of shafts 58 and is mesh-engaged with a rack 61 which is connected to a rod of an air cylinder 62. Thus, when air cylinder 62 is operated, shafts 58 rotate around their axes such that clampers 59 are rotated to clamp/unclamp.

Referring back to FIG. 2, bracket 63 is also fixed to truck 11. Two pushers 64 for pushing work 26 in the oblique direction are connected to ends of the rods of air cylinders 65, which are supported by bracket 63. When pushers 64 are operated, works 26 are ejected from lower clamp arm pins 50.

Next, operation of the above-described loading/unloading apparatus will be explained taking the unloading operation as an example.

Work 26 which has been painted in painting booth 1 is carried by arm 7 of hanger 5 to loading/unloading apparatus 4. By this time, truck 11 has been reversed to its original waiting position by quick reversing air cylinder 53. When work 26 comes to a predetermined position, variable-speed motor 15 begins its operation, and truck 11 is then driven by variable-speed motor 15 at the same speed as the moving speed of hanger 5 in the work conveying direction. More precisely, when the center of work 26 comes to the position of the center of work-holding means 46 and 47, truck 11 begins to be driven at the same speed as the conveying speed of work 26. At the same time, engaging member 10, which is fixed to the lower portion of hanger 5, is clamped by hanger clamping means 55. Hanger 5 then moves together with truck 11 so that inclining of hanger 5 is prevented.

Following the above-mentioned operation, during movement of truck 11, air cylinder 32 for driving framework 29 begins its operation so that framework 29 slides toward hanger 5 along rail 30. When framework 29 comes to a predetermined position nearest to hanger 5, it stops. At this stage, since lower clamp arm pin 50 of lower work-holding means 47 is maintained at its lowest position, interference between work 26 and lower clamp arm pin 50 does not occur. Once the framework has stopped, air cylinder 52 which operates as a clamp driving means begins its operation such that lower work-holding means 47 is moved upward. The two pairs of lower clamp arm pins 50 of lower work-holding means 47 are thus moved upward such that two works 26 are clamped at the same time between corresponding upper clamp arm pins 49 and lower clamp arm pins 50.

When clamping of work 26 between upper and lower clamp arm pins 49 and 50 has been confirmed, air cylinder 32 again operates to move framework 29 in the direction away from hanger 5 and back to its original position where it stops. When stopping of framework 29 at its original position has been confirmed, air cylinder 52 is operated so as to move lower work-holding means 47 downward so that clamp arm pins 50 unclamp work 26. At the same time, hanger clamping means 55, which has clamped engaging member 10 fixed to the lower portion of hanger 5, is rotated through operation of air cylinder 62 so that engaging member 10 is unclamped. When work 26 has been unclamped, work 26 is supported on lower clamp arm pins 50. Then, air cylinder 65 is operated so that pusher 64 pushes work 26 in the oblique direction such that work 26 is ejected from the loading/unloading apparatus 4.

When ejection of work 26 has been completed, clutch 17 of driving portion 13 of truck 11 is cut-off, and the transmission of a driving force to wheel shaft 22 is cut-off. Thus, wheel shaft 22 may rotate freely. Under this condition, air cylinder 53 for quick reversing is operated so that truck 11 is returned to its original waiting position. Truck 11 continues to wait at the waiting position until the next work 26 is conveyed to the position corresponding to the waiting position.

Since the size of a work such as a disk wheel may be varied according to the type of vehicle on which the disk wheel is to be mounted, the positions of the upper and lower work-holding means 46 and 47 must be adjustable according to the size of work 26 to be loaded/unloaded. In the above-mentioned embodiment, since lower clamp arm pins 50 of lower work-holding means 47 are driven by air cylinder 52, only the position of upper clamp arm pins 49 needs to be adjustable in the vertical direction so that upper clamp arm pins 49 can be adjusted in the vertical direction to be in the immediate vicinity of the top portion of work 26 carried by hanger 5 when upper clamp arm pins 49 are moved toward work 26 in the obliquely downward direction. This positional adjustment of upper clamp arm pins 49 is performed by manually rotating handle 43 which is connected to screw jack 34 as shown in FIG. 3. Minor positional adjustment of upper clamp arm pins 49 is possible due to spring 76.

The loading operation of loading/unloading apparatus 3 is substantially the same as the above-mentioned unloading operation except that in the loading operation work 26 is loaded on arm 7 of hanger 5. In loading, interference between work 26 and arm 7 of hanger 5 does not occur in the configuration of the present invention, because upper and lower work-holding means 46 and 47 are moved in the direction parallel to the direction in which arm 7 extends, even if arm 7 extends obliquely as in the embodiment of FIGS. 1–5.

Control of the operation of driving mechanism 13 and the various air cylinders 32, 52, 53, 62 and 65 is performed by an electric computer device (not shown) which is also electrically connected to the driving mechanism of hanger conveyer 2. The electric computer device is so designed that hanger conveyer 2 and loading/unloading apparatuses 3 and 4 can perform the above-described operation. A conventional computer can be used for such an electric computer device, and the programming of such a computer can easily be made by one skilled in the art according to conventional arts. Thus, such a computer and its associated programming are not included in the claims of the present invention since the present invention is more particularly directed to the loading/unloading apparatus as described above.

In the above explanation, the oblique extending arm 7 was described by way of example. However, the present invention also includes an embodiment where arm 7 and rail 30 extend horizontally, although the problem of paint collection on arm 7 may occur.

Consequently, according to the present invention, the following effects can be obtained:

Since rail 30 extends in the direction parallel to the direction in which arm 7 extends, loading/unloading of work 26 can smoothly be performed without causing interference between work 26 and arm 7, even if arm 7 extends obliquely upward in the direction away from support rod 6 of hanger 5.

Also, since truck 11 is driven at the same speed as hanger 5, loading/unloading of work 26 on/from the moving hanger 5 becomes possible without stopping hanger conveyer 2. As a result, production efficiency of work 26 is increased to a great extent.

Finally, since hanger 5 is held at its lower portion by hanger clamping means 55 during loading/unloading of work 26, slipping down of work 26 from hanger 5 due to inclining of hanger 5 is prevented.

Although only one embodiment of the present invention has been described in detail above, those skilled in the art will readily appreciate that many modifications are possible in the exemplary embodiment without materially departing from the novel teachings and advantages of the present invention. Accordingly, all such modifications are intended to be included within the scope of the present invention as defined in the following claims.

What is claimed is:

1. A loading/unloading apparatus for loading/unloading a work on/from a moving hanger which is driven in a work conveying direction and which comprises a vertically extending support rod and an arm for carrying a work, the arm being fixed at its one end to said support rod, said loading/unloading apparatus comprising:

a truck including a driving mechanism which is capable of driving said truck in said work conveying direction at the same speed as the speed of said hanger;

a rail fixed to said truck which is disposed in a plane which is at a right angle with respect to said work conveying direction and which extends in a direction parallel to the direction in which said arm extends;

a framework supported by said rail such that said framework slides along said rail in a direction which is at a right angle with respect to said work conveying direction, said framework including a vertically extending slide shaft;

driving means, mounted on said truck, for driving said framework relative to said truck;

a lifter connected to said framework;

upper work-holding means for clamping the work at an upper portion of the work, said upper work-holding means being supported by said lifter and guided by said slide shaft such that said upper work-holding means slides along said slide shaft in a vertical direction and such that a vertical position of said upper work-holding means is adjusted by said lifter;

lower work-holding means for clamping the work at a lower portion of the work, said lower work-holding means being guided by said slide shaft such that said lower work-holding means slides along the slide shaft in the vertical direction;

clamp driving means, interposed between said framework and said lower work-holding means, for moving said lower work-holding means relative to said upper work-holding means in the vertical direction; and hanger clamping means, mounted on said truck, for clamping an engaging member fixed to a lower portion of said support rod of said hanger, said clamping means being operated so as to clamp said engaging member when the work is being loaded-/unloaded.

2. The apparatus according to claim 1, wherein said arm extends obliquely upward in a direction away from said support rod.

3. The apparatus according to claim 1, wherein said work comprises a disk wheel for a vehicle.

4. The apparatus according to claim 1, wherein said apparatus is provided in the path of a hanger conveyer which passes through a painting booth for painting a disk wheel of a vehicle, said apparatus being disposed on a front side of the painting booth for loading a disk wheel to be painted on said hanger of said hanger conveyer.

5. The apparatus according to claim 1, wherein said apparatus is provided in the path of a hanger conveyer which passes through a painting booth for painting a disk wheel of a vehicle, said apparatus being disposed on a rear side of the painting booth for unloading a disk wheel which has been painted on said hanger of said hanger conveyer.

6. The apparatus according to claim 1, wherein a plurality of said arms are fixed to said support rod on right and left sides of said support rod with respect to said work conveying direction in such a manner that the arms on the right side and the arms on the left side are the same in number and are staggered in the vertical direction with respect to each other.

7. The apparatus according to claim 1, wherein said driving mechanism of said truck includes a variable-speed motor and a clutch, a speed of said variable-speed motor being so adjusted as to drive said truck at the same speed as the moving speed of said hanger, said clutch being cut when said truck is returned to a waiting position.

8. The apparatus according to claim 1, further comprising a quick reversing means for reversing said truck to a waiting position at a speed faster than a speed at which said truck is driven by said driving mechanism of said truck in the work conveying direction.

9. The apparatus according to claim 1, wherein said driving means comprises an air cylinder, a cylinder portion of which is connected to said truck and an end portion of a rod of which is connected to said framework.

10. The apparatus according to claim 1, wherein said lifter comprises a screw jack, an input shaft of said screw jack being connected via a connecting rod to a handle and an output shaft of said screw jack being connected to a spring mechanism which composes an upper portion of said upper work-holding means.

11. The apparatus according to claim 1, wherein said clamp driving means comprises an air cylinder, a cylinder portion of which is connected to said framework and a rod portion of which is connected to said lower work-holding means.

12. The apparatus according to claim 1, wherein said upper work-holding means includes a pair of upper clamp arm pins which extends horizontally.

13. The apparatus according to claim 1, wherein said lower work-holding means includes a pair of lower clamp arm pins which extends horizontally.

14. The apparatus according to claim 1, wherein said upper work-holding means includes two pairs of upper clamp arm pins extending horizontally, one pair of which is staggered with respect to the other pair in the vertical direction.

15. The apparatus according to claim 1, wherein said lower work-holding means includes two pairs of lower clamp arm pins extending horizontally, one pair of which is staggered with respect to the other pair in the vertical direction.

16. The apparatus according to claim 1, wherein said engaging member fixed to the lower portion of said support rod of said hanger comprises a member having a square cross-section.

17. The apparatus according to claim 1, wherein said hanger clamping means comprises a pair of Y-shaped clampers which are so rotated so as to clamp/unclamp said engaging member through a rack-gear mechanism rotated by an air cylinder.

18. The apparatus according to claim 1, further comprising a pusher which is operated by an air cylinder mounted on said truck so as to push said work.

* * * * *